United States Patent [19]
Baldwin

[11] Patent Number: 4,962,997
[45] Date of Patent: Oct. 16, 1990

[54] THREE COLOR SEPARATION USING SUBTRACTIVE DICHROIC BEAMSPLITTERS

[75] Inventor: Richard R. Baldwin, Saratoga, Calif.

[73] Assignee: Hewlett-Packard Company, Palo Alto, Calif.

[21] Appl. No.: 184,459

[22] Filed: Apr. 21, 1988

[51] Int. Cl.⁵ .................................................. G02B 27/10
[52] U.S. Cl. ..................................... 350/172; 350/330
[58] Field of Search ............... 350/356, 357, 355, 169, 350/171, 172, 173, 174, 330

[56] References Cited

U.S. PATENT DOCUMENTS

| | | | |
|---|---|---|---|
| 2,858,731 | 11/1958 | Rehorn | 350/174 |
| 2,909,097 | 10/1959 | Alden et al. | 350/174 |

FOREIGN PATENT DOCUMENTS

| | | | |
|---|---|---|---|
| 2311206 | 12/1973 | Fed. Rep. of Germany | 350/171 |
| 0178326 | 10/1983 | Japan | 350/356 |

OTHER PUBLICATIONS

Morozumi et al., SID 86 Digest, "LCD Full Color Video Projector", 1986.

*Primary Examiner*—Bruce Y. Arnold
*Assistant Examiner*—Ronald M. Kachmarik

[57] ABSTRACT

A structure is provided which receives light from a single source, separates the light into components, modulates the components with image information, and recombines the resultant image beams in order to form a multi-colored image. A small optical path length is provided for each of the separated beams, and small physical size is realized, without the use of crossed beamsplitters, with their attendant cost and performance limitations.

14 Claims, 5 Drawing Sheets

4,962,997

THREE COLOR SEPARATION USING SUBTRACTIVE DICHROIC BEAMSPLITTERS

BACKGROUND OF THE INVENTION

This invention pertains to color separation techniques and structure, for example for use in color projection display systems.

In electronic color projection display systems, the three primary colors, red, green and blue, are generally imaged separately and then combined to produce a color image. One example of a prior art electronic color projection system is shown in "LCD Full-Color Video Projector", Morozumi, Sonchara, Kamakura, Ono, and Aruga, p. 375 SID International Symposium Digest of Technical Papers, 1986. The color of a given portion of the resultant image is determined by the relative intensity of the three primary color beams used to form that portion of the image. It is desired to perform this operation efficiently in order to cause the least light loss.

One prior art color projection display separates white light from a single collimated source into the three primary colors using dichroic beamsplitters having one side exposed to air, which are dielectric interference filters having a sharp response and which does not absorb light, thereby minimizing loss. The three colors are then acted upon independently by three light valves (such as liquid crystal panels available from Seiko-Epson, Japan) and recombined using dichroic beamsplitters to produce the final color image. As shown in the prior art structure of FIG. 1, light from white light source is collimated by lens 2. The collimated white light W is directed to dichroic beamsplitter 3 which reflects the red portion R of white light W to turning mirror 4. The green portion G and blue portion B of white light W pass through beamsplitter 3 and are directed to dichroic beamsplitter 5, which reflects the blue portion B of the green, blue beam G,B toward turning mirror 6. The remaining green portion G of the green, blue beam G,B passes through beamsplitter 5 and passes through light valve 8 to produce green image beam GI, which varies in intensity to provide desired green intensity for the resultant image shown on screen 15. The red portion R of the spectrum is reflected by turning mirror 4 and passes through light valve 10 to produce red image beam RI. Similarly the blue portion B of the spectrum is reflected by turning mirrors 6 and 7 and passes through light valve 9 to produce blue image-beam BI.

The red, green and blue images are formed on light valves 10, 8, and 9, respectively, thereby providing varying attenuation over the image area and over time, resulting in red image beam RI, green image beam GI, and blue image beam BI, respectively. The green image beam GI and blue image beam BI are directed to dichroic beamsplitter 12 for recombination to form a combined green image, blue image beam GI,BI. As shown in FIG. 1, beamsplitter 12, like beamsplitter 5, transmits green light and reflects blue light. This combined beam GI,BI then passes through dichroic beamsplitter 13. Red image beam RI is reflected by turning mirror 11 to dichroic beamsplitter 13 which recombines it with green image, blue image beam GI,BI to form a white image beam WI. Like beamsplitter 3, beamsplitter 13 transmits green and blue light, and reflects red light. White image beam WI then passes through lens 14 which projects a superimposed image of red, green, and blue light valves 10, 8 and 9, respectively, onto screen 15.

Since the green portion has passed through four dichroic beamsplitters (3, 5, 12, 13) in succession, the optical path through the system is quite long, and prior art electronic color projectors of this type are much larger than a conventional projector such as movie projectors and slide projectors. Furthermore, the optical path lengths of each of the three colors are different. Since the white light from light source 1 is not perfectly collimated, the fact that the three primary color beams travel different distances means that brightness suffers, as well as color purity, since colors are attenuated to different levels. These have been recognized as serious drawbacks and efforts have been made to reduce the length of the optical path by incorporating crossed beamsplitters as shown in FIG. 2.

The optical path of FIG. 2 is essentially the same as that of FIG. 1, except that beamsplitters 3 and 5 have been incorporated into a single crossed beamsplitter, as have beamsplitters 12 and 13. This has the effect of decreasing the length of the optical path by one half, as well as decreasing the volume required to house the optical devices. Unfortunately, the three primary colors still have different path lengths, as described above with regard to FIG. 1.

Crossed beamsplitters can be fabricated in two ways. The easiest and most straightforward method is to cut one beamsplitter in two and mount the two halves adjacent to the other beamsplitter as shown in FIG. 3. In this case, beamsplitter 13 of FIG. 1 has been cut in two and the two halves mounted adjacent to beamsplitter 12. This is fairly easy to fabricate, although the two halves of beamsplitter 13 must be carefully adjusted to be coplanar. One serious disadvantage of this type of crossed beamsplitter is that a shadow is caused by the crack in the center of beamsplitter 13 which shows up in the center of the projected image. This shadow can be eliminated if beamsplitters 12 and 13 are extremely thin, but this makes it difficult to achieve sufficient beamsplitter flatness to obtain a high quality projected image.

The second method for forming crossed beamsplitters is to construct a cube beamsplitter by coating and cementing four triangular pieces of glass together as shown in FIG. 4. In theory, this eliminates the shadow in the center of the projected image, but such a beamsplitter must be precisely constructed such that:

1. There is no chamfer or chipping at the apex of any of the four triangular glass parts;

2. Each of the coated surfaces is flat all the way to the apex without edge roll;

3. The included angle a is precisely 90 degrees for each of the four glass parts;

4. All dichroic coatings extend, and are uniform, all the way to the apex; and

5. The four glass parts are properly aligned during cementing.

It is difficult to fabricate cube beamsplitters of sufficient quality that no noticeable defect appears in the center of the projected image. Cube beamsplitters are therefore quite expensive.

SUMMARY OF THE INVENTION

In accordance with the teachings of this invention, a novel structure is provided which receives light from a single source, separates the light into components, modulates the components with image information, and recombines the resultant image beams in order to form a multi-colored image. In accordance with the teachings of this invention, a small optical path length is provided for each of the separated beams, and small physical size is realized, without the use of crossed beamsplitters, with their attendant cost and performance limitations. In one embodiment, each of the three primary colors travels the same optical distance.

DETAILED DESCRIPTION OF THE INVENTION

In accordance with the teachings of this invention, a color separation and recombination means is taught in which no portion of the visible spectrum is transmitted through four successive dichroic beamsplitters, and without the need for crossed beamsplitters. This allows the optical path to be folded in such a way that the overall size of the color separation and recombination means requires no greater volume than would be required if crossed beamsplitters were used, yet without the attendant disadvantages of crossed beamsplitters. Furthermore, only two turning mirrors are required, as compared to four turning mirrors in the prior art. In accordance with the teachings of this invention, each of the three primary colors travels the same optical distance, thereby having uniform attenuation, insofar as the optical distance is concerned. Furthermore, since the white light sources are not perfectly uniform and cannot be collimated perfectly, by providing the same optical distance for each of the primary colors, so-called "hot spots" contained in the white light source will appear as a projected image as slightly greater in brightness, but without distortion in the relative intensities of the three primary colors, which would be quite noticeable.

Figure 5:
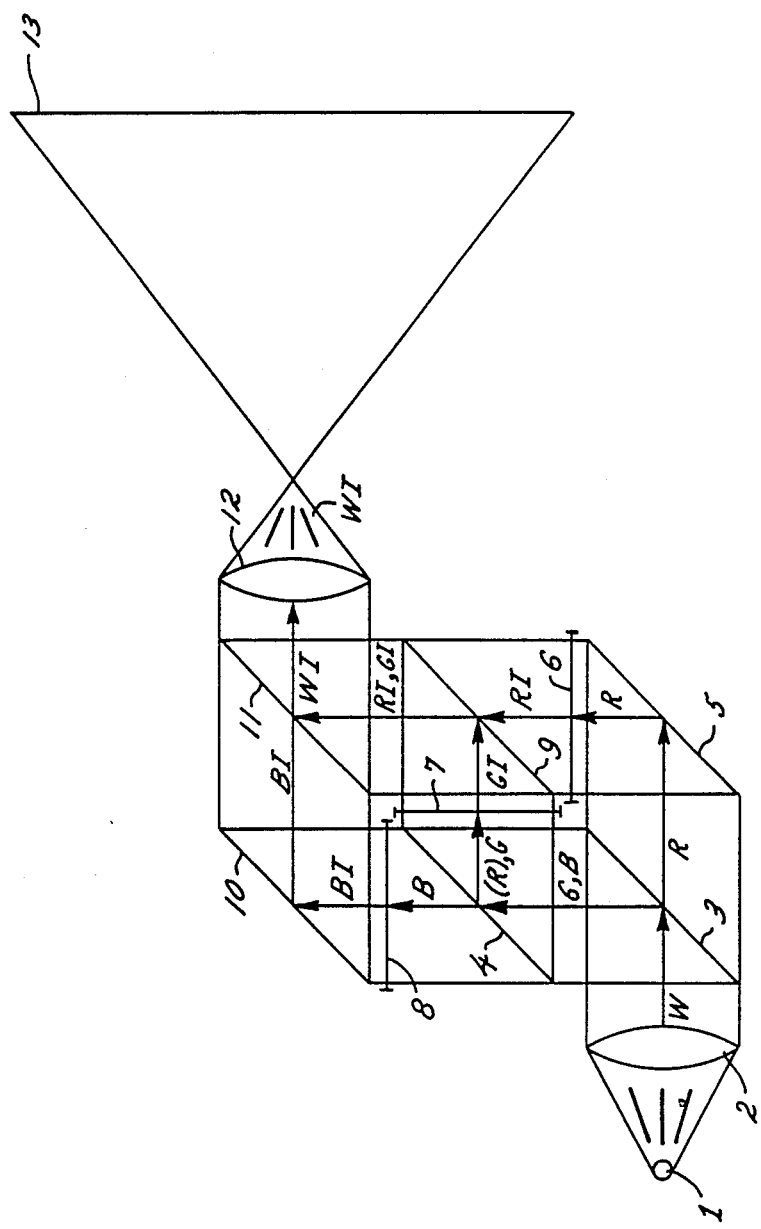
FIG. 5 depicts one embodiment of a color projection display system constructed in accordance with the teachings of this invention.

One embodiment of the invention is shown in FIG. 5, which has the advantage that the green portion of the spectrum is always reflected, and never transmitted. This has a significant advantage in that dichroic beamsplitters have greater efficiency (approximately 99%) in reflection than the efficiency (approximately 90%) during transmission, and since green is the most visible color in an image, this increases overall brightness. In FIG. 5, white light from white light source 1 passes through collimating lens 2. Collimated white light W is directed to beamsplitter 3 which reflects the green and blue (i.e. Cyan) portions G,B of white light W to a second beamsplitter 4. Conveniently, beamsplitters used in various embodiments of this invention can be dichroic beamsplitters having one surface mounted on a glass plate and the other surface exposed to the air, such as are available from Optical Coating Laboratories of Santa Rosa, Calif. The red portion R of white light W is transmitted through beamsplitter 3 to turning mirror 5, which reflects it through red image light valve 6 to form red image beam RI. The light valves described in the various embodiments of this invention can conveniently comprise liquid crystal display (LCD) light panels, for example having a pixel arrangement of 440 pixels by 480 pixels, which are available from Seiko-Epson of Suwa, Japan. Dichroic beamsplitter 4 is coated such that the red and green (i.e. yellow) portions of the spectrum are reflected and the blue portion of the spectrum is transmitted.

The green portion G of the spectrum is reflected by beamsplitter 4 through green image light valve 7 to form green image beam GI. The blue portion B of the spectrum is transmitted through beamsplitter 4 and passes through blue image light valve 8 to form blue image beam BI. The red image beam RI and green image beam GI are then recombined by beamsplitter 9 which, like beamsplitter 3, reflects green and blue and transmits red. Blue image beam BI is reflected by turning mirror 10 toward beamsplitter 11 where it is recombined with the combined red and green image beams RI,GI from beamsplitter 9. Beamsplitter 11, like beamsplitter 4, reflects red and green (i.e. yellow), and transmits blue.

Figure 1:
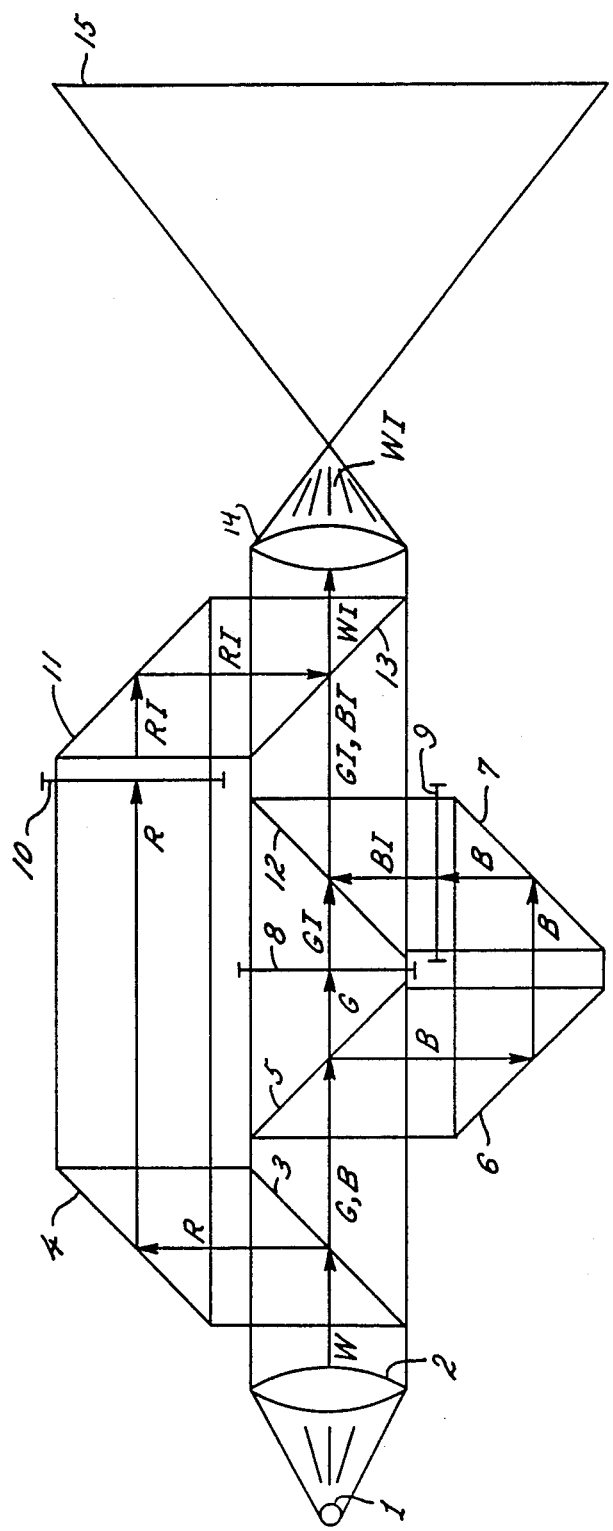
FIG. 1 depicts a prior art color projection display system.
Figure 2:
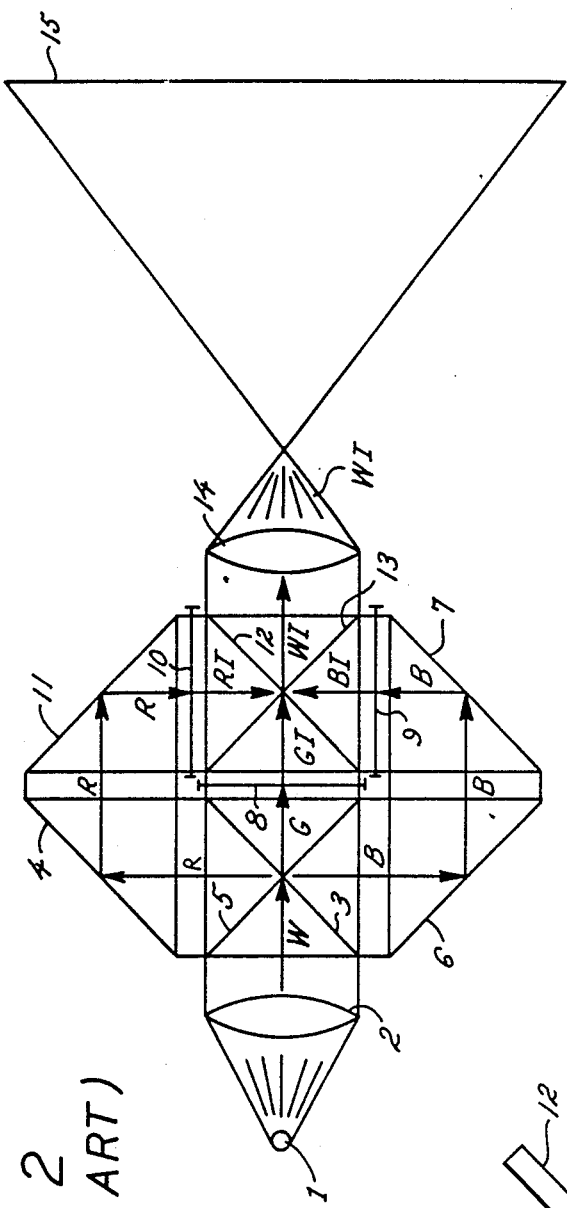
FIG. 2 depicts a prior art color projection display system utilizing crossed beamsplitters.
Figure 4:
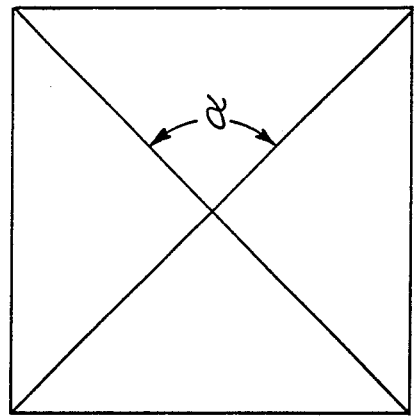
FIG. 4 depicts a typical cube-type crossed beamsplitter, known in the prior art.
Figure 3:
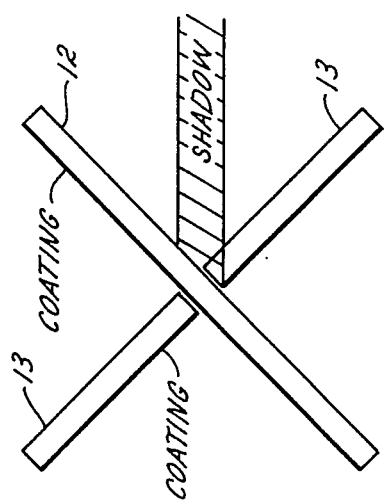
FIG. 3 depicts a typical crossed beamsplitter, known in the prior art.

At this point, the red image beam RI, green image beam GI, and blue image beam BI have all been recombined to form white image beam WI. White image beam WI then passes through lens 12 which projects a full color image onto screen 13. The proportions of red, green, and blue contained on any spot of the image projected onto screen 13, at any given time, is determined by the attenuation provided to the appropriate color beam at a location in the cross-section of the color beam corresponding to the point of interest on screen 13. Of importance, in accordance with the teachings of this invention, the volume necessary to store the optical components required for color separation and recombination of image beams is the same as in the prior art example using crossed beamsplitters, shown in FIG. 2.

Figure 6:
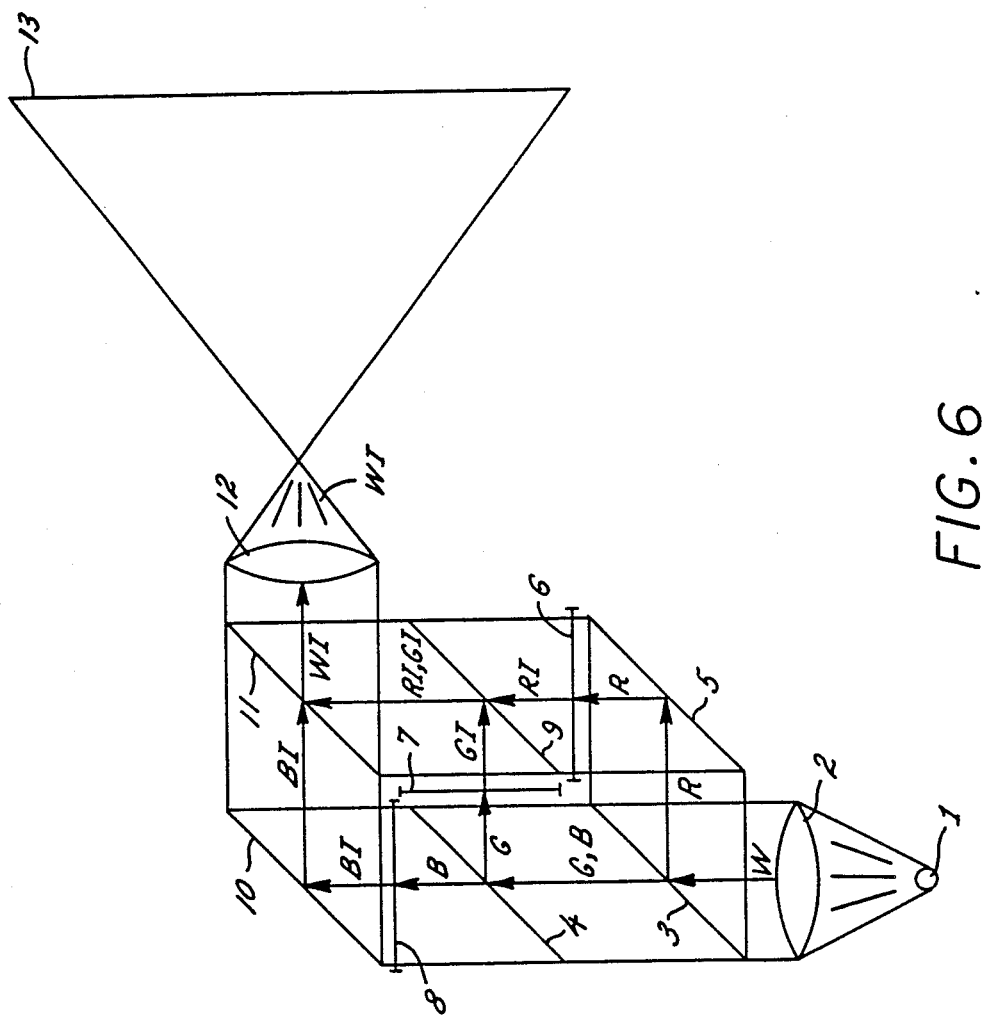
FIG. 6 depicts another embodiment of a color projection display system constructed in accordance with the teachings of this invention.
Figure 7:
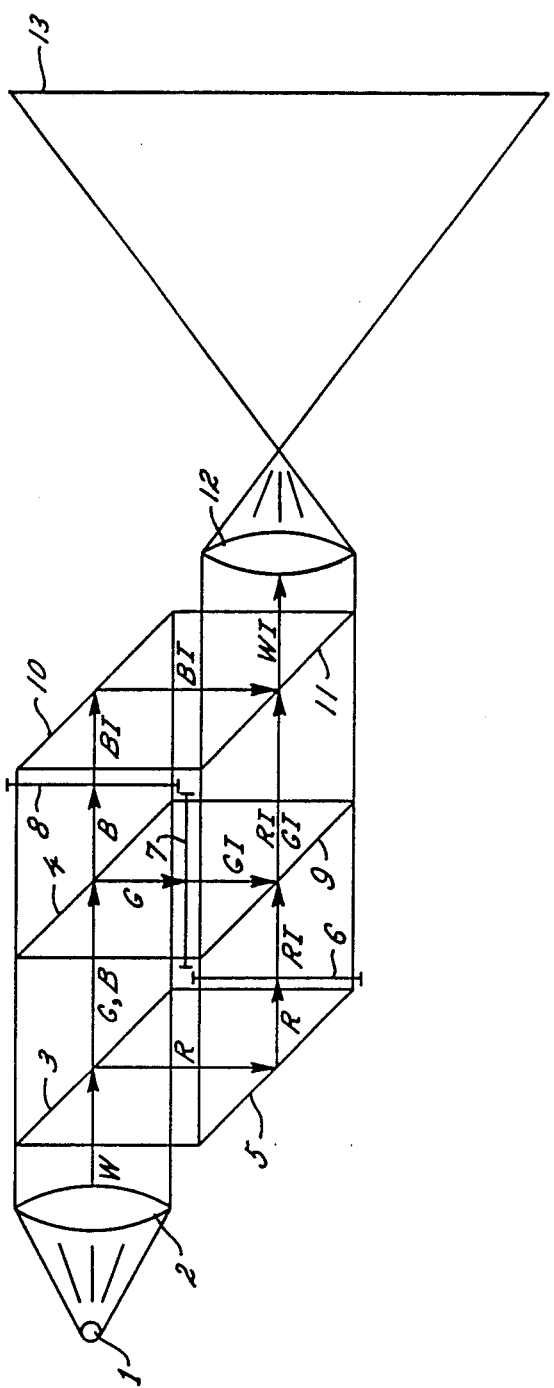
FIG. 7 depicts yet another embodiment of a color projection display system constructed in accordance with the teachings of this invention.

Alternative embodiments of the invention are shown in FIGS. 6 and 7. The optical path in the embodiment of FIG. 6 is identical to that shown in the embodiment of FIG. 5 with the exception that beamsplitter 3 of FIG. 6 reflects red and transmits green and blue (i.e. Cyan). The optical path in the embodiment of FIG. 7 is identical to that shown in the embodiment of FIG. 6 with the exception that beamsplitter 11 of FIG. 7 reflects blue and transmits red and green (i.e. yellow).

Although the embodiments of the invention shown in FIGS. 6 and 7 may be useful in certain applications where such optical paths would leave space available for power supplies or other non-optical portions of the projector, they require additional dichroic coatings which are unnecessary in the embodiment shown in FIG. 5. Furthermore, the embodiments of FIGS. 6 and 7 do not provide that the green portion of the spectrum is always reflected, as is the case with the previously described embodiment of FIG. 5. This is a slight disadvantage as compared with the embodiment of FIG. 5.

All publications and patent applications are herein incorporated by reference to the same extent as if each individual publication or patent application was specifically and individually indicated to be incorporated by reference. The invention now being fully described, it will be apparent to one of ordinary skill in the art that many changes and modifications can be made thereto without departing from the spirit or scope of the appended claims.

What is claimed is:

1. An optical transmission system comprising:
   a light source for providing a first, a second, and a third color of light;
   a first means for passing in a first direction said second and third colors of light while passing in a second direction said first color of light as a separated first color source, said first means comprising a filter which passes said first color and reflects said second and third colors in a single direction;
   a second means for passing in a first direction said second color of light as a separated second color source while passing in a second direction said third color of light as a separated third color source;
   a first image light valve means for receiving light from said separated first color source and modulating said light with image information to provide a first image beam of said first color;
   a second image light valve means for receiving light from said separated second color source and modulating said light with image information to provide a second image beam of said second color;
   a third image light valve means for receiving light from said separated third color source and modulating said light with image information to provide a third image beam of said third color; and
   means for combining said first, second, and third image beams to provide a multi-colored image beam, wherein said means for combining comprises:
   a first filter which passes a first one of said image beams and reflects a second one of said image beams; and
   a second filter which passes said first and second ones of said image beams and reflects a third one of said image beams,
   wherein none of said first, second or third color of light impinge upon more than three filters.

2. An optical transmission system comprising:
   a light source for providing a first, a second and a third color of light;
   a first means for passing in a first direction said second and third colors of light while passing in a second direction said first color of light as a separated first color source, said first means comprising a filter which passes said first color and reflects said second and third colors in a single direction;
   a second means for passing in a first direction said second color of light as a separated second color source while passing in a second direction said third color of light as a separated third color source;
   a first image light valve means for receiving light from said separated first color source and modulating said light with image information to provide a first image beam of said first color;
   a second image light valve means for receiving light from said separated second color source and modulating said light with image information to provide a second image beam of said second color;
   a third image light valve means for receiving light from said separated third color source and modulating said light with image information to provide a third image beam of said third color; and
   means for combining said first, second, and third image beams to provide a multi-colored image beam, wherein said means for combining comprises:
   a first filter which passes a first one of said image beams and reflects a second one of said image beams; and
   a second filter which reflects said first and second ones of said image beams and passes a third one of said image beams,
   wherein none of said first, second or third color of light impinge upon more than three filters.

3. A system as in claim 1 or 2 wherein said light source comprises a white light source.

4. A system as in claim 1 or 2 wherein said light source comprises a source of collimated light.

5. A system as in claim 1 or 2 which further comprises means for focusing said multi-colored image beam.

6. A system as in claim 1 or 2 which further comprises means for focusing said multi-colored image beam.

7. A system as in claim 1 or 2 wherein one or more of said first, second, and third image light valve means comprise liquid crystal panels capable of modulating said light with image information.

8. A system as in claim 1 or 2 wherein a green color beam is not passed through any of said filters.

9. A color separation and recombination apparatus for color projection display systems comprising:
   means for separating an input light beam into a plurality of color component light beams having a plurality of separate beam paths;
   a plurality of image light valves disposed, one each, in said plurality of beam paths, said image light valves modulating said color component light beams with image information;
   means for combining the color component light beams to produce the output light beam; and
   an optical path for each color component light beam defined by the means for separating and means for combining such that each color component light beam travels an equal optical path.

10. An apparatus as in claim 9 wherein said image light valves each comprise a liquid crystal panel capable of modulating said light beams with image information.

11. An apparatus as in claim 9 which further comprises a white light source for providing said input light beam.

12. An apparatus as in claim 4 wherein said light source comprises a source of collimated light.

13. An apparatus as in claim 9 wherein said means for separating comprise dichroic beamsplitters.

14. An apparatus as in claim 9 wherein said means for combining comprise dichroic beamsplitters.

* * * * *